US012733084B2

(12) United States Patent
Wen et al.

(10) Patent No.: US 12,733,084 B2
(45) Date of Patent: Sep. 8, 2026

(54) DIMMING POWER SUPPLY

(71) Applicant: Zhuhai Shengchang Electronics Co., Ltd., Zhuhai City (CN)

(72) Inventors: Guobiao Wen, Zhuhai City (CN); Xianyun Zhao, Zhuhai City (CN); Dehua Zheng, Zhuhai City (CN)

(73) Assignee: Zhuhai Shengchang Electronics Co., Ltd.

( * ) Notice: Subject to any disclaimer, the term of this patent is extended or adjusted under 35 U.S.C. 154(b) by 189 days.

(21) Appl. No.: 18/897,093

(22) Filed: Sep. 26, 2024

(65) Prior Publication Data

US 2026/0059638 A1 Feb. 26, 2026

(30) Foreign Application Priority Data

Aug. 26, 2024 (CN) ........................ 202411171079.4

(51) Int. Cl.

| | |
|---|---|
| ***H05B 47/25*** | (2020.01) |
| ***H02H 3/08*** | (2006.01) |
| ***H05B 45/10*** | (2020.01) |
| ***H05B 45/325*** | (2020.01) |
| ***H05B 45/50*** | (2022.01) |

(52) U.S. Cl.

CPC ............... *H05B 47/25* (2020.01); *H02H 3/08* (2013.01); *H05B 45/10* (2020.01); *H05B 45/325* (2020.01); *H05B 45/50* (2020.01)

(58) Field of Classification Search

CPC ...... H05B 47/25; H05B 45/50; H05B 45/325; H05B 45/10; H02H 3/08

See application file for complete search history.

(56) References Cited

U.S. PATENT DOCUMENTS

| | | | | |
|---|---|---|---|---|
| 2002/0021539 A1* | 2/2002 | Odaohhara | .......... | H03K 17/063 361/103 |
| 2015/0022248 A1* | 1/2015 | Fukami | .................. | H02M 3/07 327/110 |
| 2020/0366079 A1* | 11/2020 | Telefus | ................ | G01R 15/202 |
| 2025/0383405 A1* | 12/2025 | Yang | ................. | G01R 31/3835 |

FOREIGN PATENT DOCUMENTS

| | | |
|---|---|---|
| CN | 117881038 A | 4/2024 |

* cited by examiner

*Primary Examiner* — Scott Bauer

(74) *Attorney, Agent, or Firm* — Rondaus PLLC; George Liu

(57) ABSTRACT

The present disclosure discloses a dimming power supply, which includes a power supply circuit, a power control transistor, a control circuit, a driving circuit and a short-circuit protection circuit. The short-circuit protection circuit includes a voltage sampling circuit and a first switching device, an input end of the voltage sampling circuit is connected to the negative electrode of the load, an output end of the voltage sampling circuit is connected to a control end of the first switching device, and when the first switching device is turned on, a signal input to the gate of the power control transistor is pulled down or truncated. A second switching device is connected in series in the voltage sampling circuit, a control end of the second switching device is connected to the gate of the power control transistor, when the power control transistor is turned off, the second switching device is turned off.

7 Claims, 4 Drawing Sheets

DIMMING POWER SUPPLY

TECHNICAL FIELD

The present disclosure relates to the technical field of power supplies, and in particular to a dimming power supply.

BACKGROUND

Existing dimming power supplies typically adjust the output of the power supply and achieve the purpose of dimming or color adjustment by controlling the switching frequency of the power Metal-Oxide-Semiconductor (MOS) transistor series-connected at the output end. When the short circuit occurs at the output, the power MOS transistor may be damaged due to the excessive instantaneous or continuous output power during the short circuit, resulting in breakdown. To prevent this phenomenon, current dimming power supplies available on the market are provided with short-circuit protection circuits to protect the power devices from damage in the event of a short circuit.

Currently, the short-circuit protection solution available on the market triggers the short-circuit protection mechanism by connecting a sampling resistor in series at the output end and collecting the output current. However, this protection method is only suitable for resistive load lamps or lamps with low inrush currents. When connected to capacitive or inductive load lamps with high inrush currents, it is highly susceptible to falsely triggering the short-circuit protection due to the instantaneous inrush current, causing the power supply to malfunction and unable to output properly. If the current sampling time is increased or the response speed of the protection circuit is reduced to avoid the above problems, it will increase the risk of damaging the power devices. Therefore, there is a need to design a dimming power supply that is suitable for lamp loads with high inrush currents.

SUMMARY

In order to overcome the shortcomings of the prior art, the purpose of the present disclosure is to provide a dimming power supply that can avoid the problem of short-circuit protection being easily falsely triggered by inrush current when connected to lamp loads with high input inrush currents, without reducing the sensitivity of the short-circuit protection.

In order to solve the above problems, the technical solution adopted by the present disclosure is as follows: a dimming power supply, comprising: a power supply circuit, wherein an output end of the power supply circuit is connected with a load; a power control transistor, wherein the power control transistor is connected in series between the power supply circuit and a negative electrode of the load; a control circuit, an input end of the control circuit is connected with the output end of the power supply circuit; a driving circuit, an input end of the driving circuit is connected with an output end of the control circuit, and an output end of the driving circuit is connected with a gate of the power control transistor; and a short-circuit protection circuit, wherein the short-circuit protection circuit includes a voltage sampling circuit and a first switching device, an input end of the voltage sampling circuit is connected to the negative electrode of the load, and an output end of the voltage sampling circuit is connected to a control end of the first switching device; when the first switching device is turned on, a signal input to the gate of the power control transistor is pulled down or truncated, a second switching device is connected in series in the voltage sampling circuit, a control end of the second switching device is connected to the gate of the power control transistor, and when the power control transistor is turned off, the second switching device is turned off.

Compared with the prior art, the beneficial effects of the present disclosure are as follows: By employing a voltage sampling circuit to collect the output voltage for triggering short-circuit protection, it eliminates the impact of power output inrush currents. Consequently, when connected to lamp loads with high input inrush currents, the short-circuit protection will not be falsely triggered by the relatively high inrush current during the initial power-on phase, enabling normal operation. When the short-circuit occurs in the lamp load, the voltage output by the power supply circuit is directly input to the control end of the first switching device via the voltage sampling circuit, causing the first switching device to close. This immediately pulls down or truncates the signal output from the driving circuit to the gate of the power control transistor, turning off the power control transistor. This prevents the power control transistor from being damaged by breakdown during a short circuit and ensures a swift and sensitive response for short-circuit protection. Once the power control transistor is turned off, the second switching device also turns off, thereby disconnecting the connection between the load and the common ground. This avoids the formation of a loop between the power supply circuit and the lamp load through the voltage sampling circuit when the power control transistor is turned off, which could potentially cause afterglow in the lamp.

In the above-mentioned dimming power supply, the first switching device is connected in series between the input end of the driving circuit and a common ground, or the first switching device is connected in series between the output end of the driving circuit and the common ground.

In the above-mentioned dimming power supply, the driving circuit includes a pulse width modulation (PWM) signal amplification circuit and a driving control transistor, an input end of the PWM signal amplification circuit is connected with the output end of the control circuit, an output end of the PWM signal amplification circuit is connected with the gate of the power control transistor through a source and a drain of the driving control transistor, a gate of the driving control transistor is connected with an operating voltage, and the gate of the driving control transistor is connected to the common ground through the first switching device.

In the above-mentioned dimming power supply, the voltage sampling circuit further includes a plurality of voltage dividing resistors, one end of a voltage dividing resistor R4 is connected with the negative electrode of the load, another end of the voltage dividing resistor R4 is connected with a drain of the second switching device, a source of the second switching device is grounded through a voltage dividing resistor R2, a gate of the first switching device is connected with one end of the voltage dividing resistor R2 facing away from the common ground, a source of the first switching device is connected to the common ground, and a drain of the first switching device is connected with the input end of the driving circuit, the output end of the driving circuit or the gate of the driving control transistor.

In the above-mentioned dimming power supply, the control end of the second switching device is connected with the gate of the power control transistor through an elimination control circuit.

In the above-mentioned dimming power supply, the elimination control circuit includes a plurality of resistors, the gate of the power control transistor is connected with the control end of the second switching device through a resistor R5, and the control end of the second switching device is connected with the common ground through a resistor R6.

In the above-mentioned dimming power supply, the elimination control circuit includes a plurality of resistors and transistors, the control end of the second switching device is connected with the common ground through the resistor R6, the control end of the second switching device is connected with the operating voltage through the resistor R5, a collector and an emitter of a triode Q4 and a resistor R7, one end of the resistor R7 facing away from the operating voltage is connected with a gate of the triode Q4 through a resistor R8, the gate of the triode Q4 is connected with the common ground through a drain and a source of a MOS transistor Q5, a gate of the MOS transistor Q5 is connected with the gate of the power control transistor through a resistor R10, and one end of the resistor R10 facing away from the power control transistor is connected with the common ground through a resistor R9.

The present disclosure will be further described in detail below in conjunction with the accompanying drawings and specific embodiments.

DETAILED DESCRIPTION OF THE EMBODIMENTS

Figure 1:
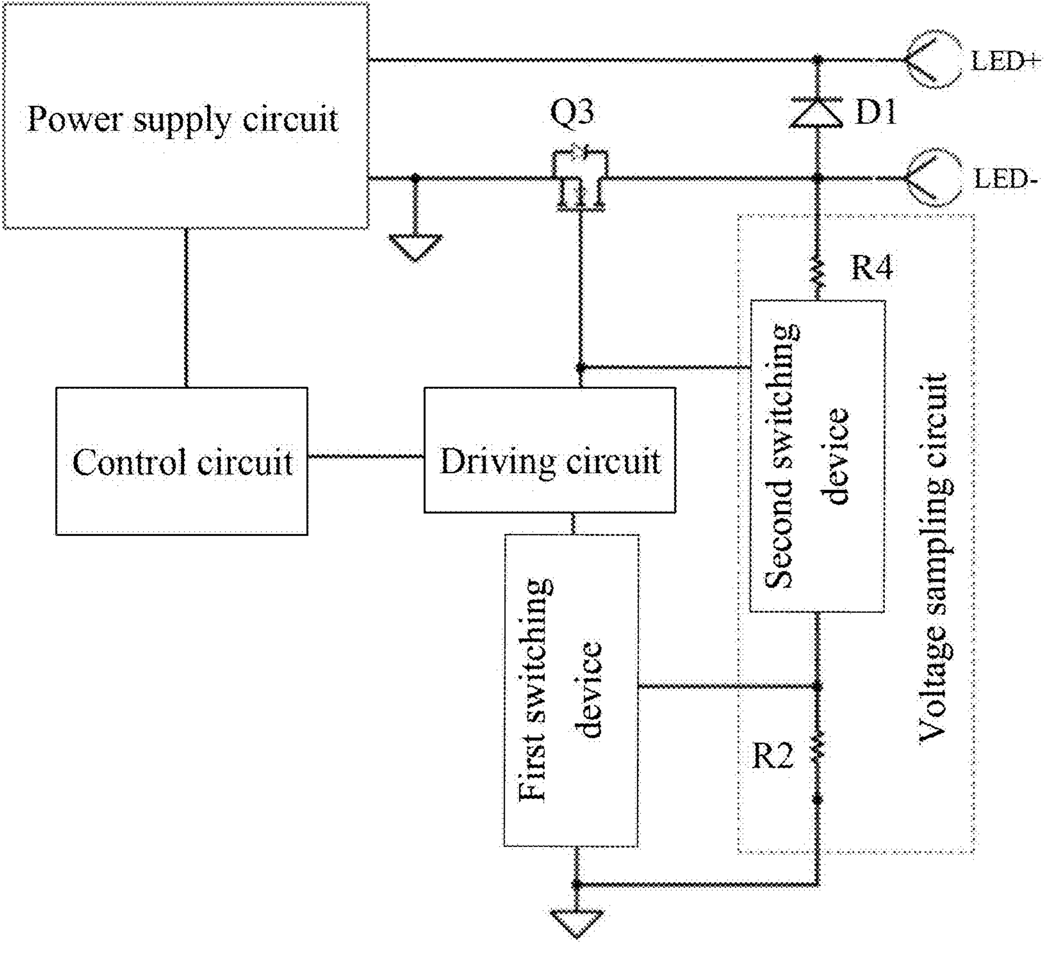
FIG. 1 is a functional block diagram of a dimming power supply according to a first embodiment of the present disclosure.

The embodiments of the present disclosure are described in detail below. With reference to FIG. 1, the embodiment of the present disclosure provides a dimming power supply, comprising a power supply circuit, a power control transistor Q3, a control circuit, a driving circuit and a short-circuit protection circuit. The input end of the power supply circuit is connected with the input voltage, the output end of the power supply circuit is connected with the lamp load, and the power control transistor Q3 is connected in series between the output end of the power supply circuit and the negative electrode of the lamp load. The power supply circuit can be an Alternating Current (AC)/Direct Current (DC) circuit or a DC/DC circuit, converting the input mains power into a direct current and an operating voltage, or converting the input direct current into the operating voltage to drive the load, the control circuit, the driving circuit and the like. The control circuit is used for generating a control signal of the power control transistor Q3 according to the dimming control signal, and the driving circuit is used for converting the control signal into a driving signal that drives the power control transistor Q3 to operate, so as to control the switching frequency of the power control transistor Q3, thereby adjusting the power of the electric energy output to the load. The short-circuit protection circuit includes a voltage sampling circuit and a first switching device, the control end of the first switching device is connected with the negative electrode of the load through the voltage sampling circuit, and the voltage sampling circuit converts the voltage after load voltage division into an electric signal that drives the first switching device to operate. When the load is short-circuited, the voltage output from the power supply circuit to the load is directly applied to the voltage sampling circuit, so that the voltage output from the voltage sampling circuit to the control end of the first switching device increases and is higher than the threshold voltage required for the first switching device, so that the first switching device operates. The signal output by the driving circuit to the gate of the power control transistor Q3 is pulled down or truncated, causing the power control transistor Q3 to turn off, thus preventing high-power current breakdown and burnout when the power control transistor Q3 is short-circuited. A second switching device is connected in series in the voltage sampling circuit, the control end of the second switching device is connected to the gate of the power control transistor Q3, and is synchronously turned on or off with the power control transistor Q3. When the power control transistor Q3 is turned off, the voltage sampling circuit is isolated from the load, so that the power supply circuit and the load are prevented from being connected with the common ground through the voltage sampling circuit at the moment to form a loop, which may cause the lamp load to produce afterglow.

According to the dimming power supply provided by the embodiment of the present disclosure, the voltage sampling circuit is directly adopted to collect the voltage value after the voltage output from the power supply circuit to the load has been divided by the load, in order to detect whether a short-circuit occurs in the load. This approach avoids the problem that traditional schemes, which rely on current sampling, are prone to being mistakenly triggered by large inrush currents. It ensures that the dimming power supply can operate normally and output power when driving lamp loads that are prone to generating high input inrush currents, such as capacitive or inductive loads. When the short-circuit occurs in the load, the voltage output from the power supply circuit will be directly applied to the voltage sampling circuit, causing the output of the voltage sampling circuit to quickly rise above the threshold value for activating the first switching device. This triggers the first switching device to operate, pulling down or truncating the control signal output from the driving circuit to the power control transistor Q3, causing the power control transistor Q3 to rapidly turned off. The response speed for short-circuit protection is thus very fast. The dimming power supply in the embodiment of the present disclosure can avoid short-circuit protection being mistakenly triggered by inrush currents without compromising the sensitivity of the short-circuit protection, and simultaneously solves the afterglow problem caused by the added voltage sampling circuit after short-circuit protection is triggered, by serially connecting the second switching device in the voltage sampling circuit.

It can be understood that the voltage sampling circuit can be a voltage conversion circuit such as a voltage divider circuit or a voltage stabilizing circuit, and the first switching device can control the power control transistor Q3 to be turned off during short circuit by pulling down or truncating the control signal input to the driving circuit by the control circuit, or directly pulling down or truncating the driving signal output by the driving circuit. The first switching device and the second switching device can adopt controllable semiconductor elements such as triodes and MOS transistors, and the specific structure of the short-circuit protection circuit needs to be determined based on the actual power range of the power supply circuit and the load, as well as the types of the selected first switching device and the second switching device. The control circuit preferably uses a PWM control signal to control the turn-on and turn-off of the power control transistor Q3, and the driving circuit is a corresponding PWM signal amplification circuit.

Figure 2:
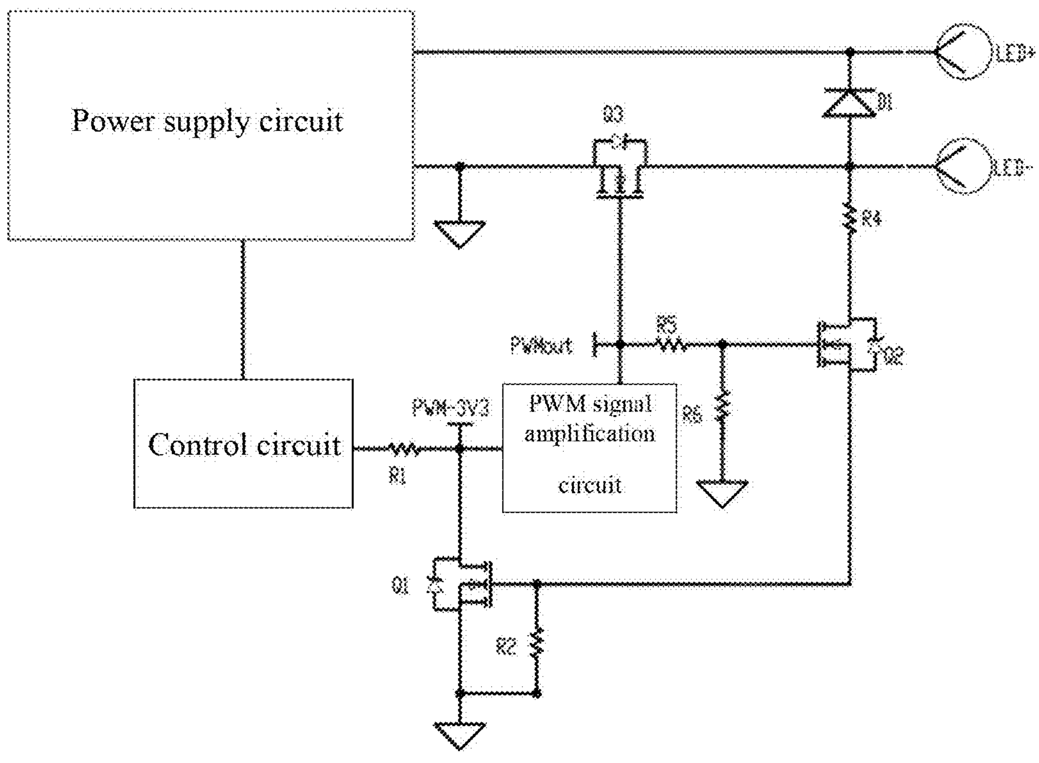
FIG. 2 is a circuit schematic diagram of a dimming power supply according to a first embodiment of the present disclosure.

Embodiment 1: Referring to FIG. 2, in this embodiment, both the first switching device and the second switching device are NMOS transistors, and the voltage sampling circuit is a voltage divider circuit composed of voltage dividing resistors R2 and R4. One end of a voltage dividing resistor R4 is connected to the negative electrode of the load, another end of the voltage dividing resistor R4 is connected to a drain of the second switching device Q2, a source of the second switching device Q2 is connected to the common ground through a voltage dividing resistor R2. The voltage dividing resistor R4 serves not only as a voltage dividing resistor in the voltage sampling circuit but also as a current limiting resistor of the second switching device Q2. The drain of the first switching device Q1 is connected to the input end of the PWM signal amplification circuit, the source is connected to the common ground, and the gate is connected to one end of the voltage dividing resistor R2 facing away from the common ground. The gate of the second switching device Q2 is connected to the output end of the PWM signal amplification circuit through the resistor R5, and is connected to the common ground through the resistor R6. During normal operation of the dimming power supply, the driving signal output by the PWM signal amplification circuit is converted into the driving voltage that drives the conduction of the second switching device Q2 by the elimination control circuit composed of resistors R5 and R6, so that the voltage output by the power supply circuit can flow into the voltage sampling circuit through the load. When the short circuit occurs in the load, the voltage output by the power supply circuit is directly input to the voltage sampling circuit, causing the voltage input to the gate of the first switching device Q1 after voltage division of the voltage dividing resistor R4, the second switching device Q2 and the voltage dividing resistor R2 to increase, and when the voltage between the gate and source of the first switching device Q1 is higher than its conduction threshold, the first switching device Q1 is turned on, so that the PWM control signal output from the control circuit to the PWM signal amplification circuit is pulled down to a low level, causing the PWM signal amplification circuit to output a low level, thereby turning off the power control transistor Q3 and providing short-circuit protection for the power control transistor Q3. At the same time, since the driving signal output by the PWM signal amplification circuit becomes low level, the voltage between the gate and source of the second switching device Q2 decreases below its conduction threshold, causing the second switching device Q2 to turn off. This disconnects the connection between the load and the common ground through the voltage sampling circuit, preventing the load from forming a loop with the common ground through the voltage sampling circuit after the power control transistor Q3 is turned off. As a result, it avoids the afterglow generated by the lamp load after the short-circuit protection is triggered.

In this embodiment, the junction capacitance of the power control transistor Q3 should be greater than the sum of the junction capacitances of the first switching device Q1 and the second switching device Q2, so that the conduction time of the power control transistor Q3 is longer than the sum of the conduction times of the second switching device Q2 and the first switching device Q1. This allows the first switching device Q1 to turn off after the second switching device Q2 turns off, and the PWM signal amplification circuit to resume normal output. If the load short circuit is not eliminated, the first switching device Q1 will also turn on after the second switching device Q2 turns on, thereby turning off the power control transistor Q3 again. Since the conduction time of the power control transistor Q3 is longer than the sum of the conduction times of the first switching device Q1 and the second switching device Q2, when the load short circuit is not eliminated, the power control transistor Q3 will keep switching on and off, and it will be turned off before it is fully turned on during each on-process, thereby preventing the power control transistor Q3 from being damaged. When the load short circuit is eliminated, the dimming power supply will automatically resume normal operation.

Figure 3:
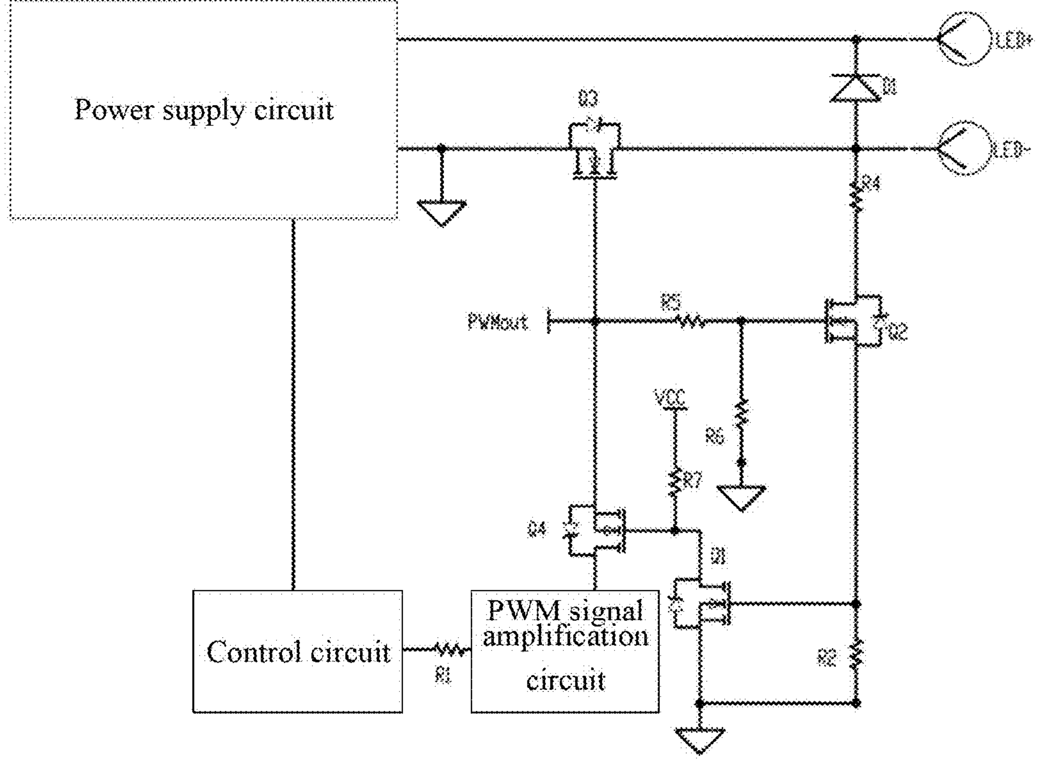
FIG. 3 is a circuit schematic diagram of a dimming power supply according to a second embodiment of the present disclosure.

Embodiment 2: Referring to FIG. 3, in some embodiments, the driving signal output by the PWM signal amplification circuit cannot directly drive the power control transistor Q3. The output end of the PWM signal amplification circuit needs to be connected to the power control transistor Q3 through the driving control transistor Q4. The gate of the driving control transistor Q4 is connected to the operating voltage through the resistor R7 and is also connected to the drain of the first switching device Q1. The source of the driving control transistor Q4 is connected to the gate of the power control transistor Q3, and the drain is connected to the output end of the PWM signal amplification circuit. During normal operation, the first switching device Q1 is turned off, and the driving control transistor Q4 is turned on under the drive of the operating voltage, so that the driving signal output by the PWM signal amplification circuit can be output to the gates of the power control transistor Q3 and the second switching device Q2, enabling both of them to conduct. When the short circuit occurs in the load, the first switching device Q1 turns on, causing the gate of the driving control transistor Q4 to be connected to the common ground and turned off, thereby turning off the power control transistor Q3 and the second switching device Q2, protecting the power control transistor Q3 and eliminating afterglow. In this embodiment, in order to keep the power control transistor Q3 turned off or repeatedly turned off before it is fully turned on during the short circuit, the conduction time of the driving control transistor Q4 needs to be longer than the sum of the conduction times of the first switching device Q1 and the second switching device Q2, or the conduction time of the power control transistor Q3 needs to be longer than the sum of the conduction times of the first switching device Q1, the second switching device Q2, and the driving control transistor Q4.

Figure 4:
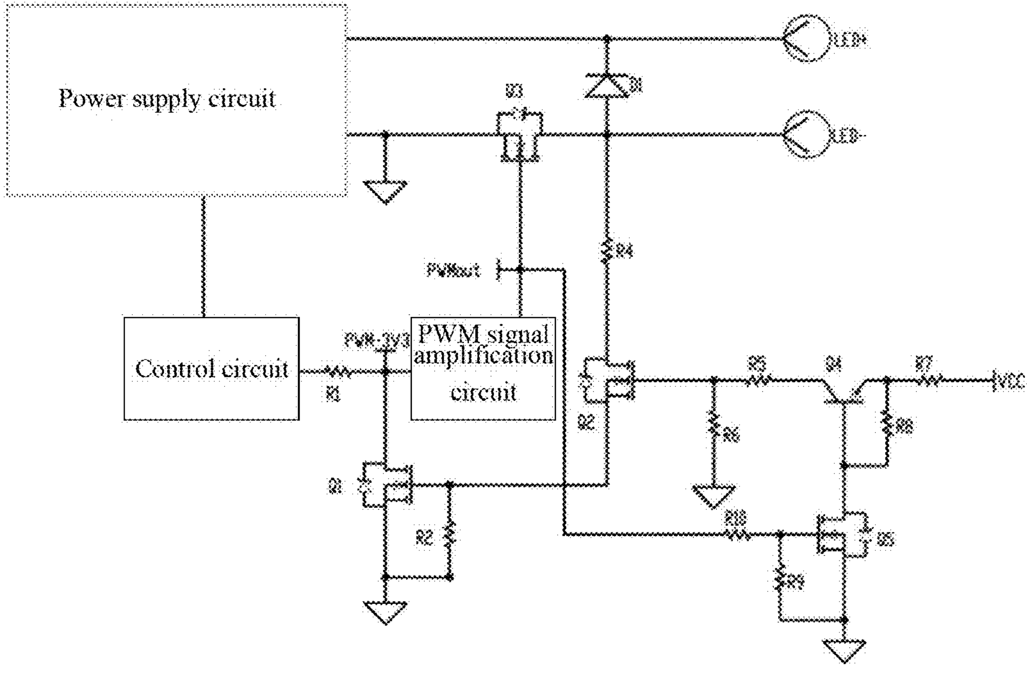
FIG. 4 is a circuit schematic diagram of a dimming power supply according to a third embodiment of the present disclosure.

Embodiment 3: Referring to FIG. 4, in some embodiments, the driving signal output by the PWM signal amplification circuit cannot directly drive the second switching device Q2 to conduct. In addition to the resistors R5 and R6, the elimination control circuit of the second switching device Q2 also includes the triode Q4 and the MOS transistor Q5. The gate of the MOS transistor Q5 is connected to the output end of the PWM signal amplification circuit through the resistor R10 and connected to the common ground through the resistor R9. The source of the MOS transistor Q5 is grounded, and the drain is connected to the gate of the triode Q4. The emitter of the triode Q4 is connected to the operating voltage through the resistor R7, and the collector is connected to the gate of the second switching device Q2 through the resistor R5. The resistor R8 is connected in parallel between the gate and emitter of the triode Q4. The gate of the second switching device Q2 is connected to the common ground through the resistor R6. During normal operation, the driving signal output by the PWM signal amplification circuit drives the MOS transistor Q5 to conduct, which in turn enables the triode Q4 to conduct. The operating voltage is then input to the gate of the second switching device Q2 after being divided by the resistors R5, R6, and R7, causing the second switching device Q2 to conduct. When the short circuit occurs in the load, the first switching device Q1 turns off, causing the PWM signal amplification circuit to output a low level. As a result, the MOS transistor Q5 and triode Q4 disconnect, reducing the gate voltage of the second switching device Q2 and causing the second switching device Q2 to turn off. This eliminates the afterglow of the lamp load after the short-circuit protection is triggered.

It should be noted that, in the description of the present disclosure, any references to orientation, such as "up", "down", "front", "back", "left", "right", etc., are based on the orientation or positional relationships depicted in the accompanying drawings. These references are solely for the convenience of describing the present disclosure and simplifying the description. They do not indicate or imply that the device or element referred must have a specific orientation, be constructed or operated in a particular orientation, and should not be construed as a limitation of the present disclosure.

In the description of the present disclosure, "a plurality of" shall refer to one or more, "multiple" shall refer to two or more, and expressions such as "more than," "less than," "exceed," etc., shall be understood as excluding the stated number. Expressions such as "above," "below," "within," etc., shall be understood as including the stated number. If references to "first" or "second" are made, they are merely for the purpose of distinguishing technical features, and should not be understood to indicate or imply relative importance, or implicitly specify the number of technical features being referred to, or imply any order of precedence among the technical features.

In the description of the present disclosure, unless otherwise explicitly limited, words such as "provided with", "install", and "connect" should be understood in a broad sense. Those skilled in the art can reasonably determine the specific meaning of the above words in the present disclosure in combination with the specific content of the technical solution.

The above-mentioned embodiments are only preferred embodiments of the present disclosure and cannot be used to limit the scope of protection of the present disclosure. Any non-substantive changes and substitutions made by those skilled in the art on the basis of the present disclosure shall belong to the scope of protection claimed by the present disclosure.

What is claimed is:

1. A dimming power supply, comprising:

a power supply circuit, wherein an output end of the power supply circuit is connected with a load;

a power control transistor, wherein the power control transistor is connected in series between the power supply circuit and a negative electrode of the load;

a control circuit, an input end of the control circuit is connected with the output end of the power supply circuit;

a driving circuit, an input end of the driving circuit is connected with an output end of the control circuit, and an output end of the driving circuit is connected with a gate of the power control transistor; and a short-circuit protection circuit, wherein the short-circuit protection circuit includes a voltage sampling circuit and a first switching device, an input end of the voltage sampling circuit is connected to the negative electrode of the load, and an output end of the voltage sampling circuit is connected to a control end of the first switching device; when the first switching device is turned on, a signal input to the gate of the power control transistor is pulled down or truncated, a second switching device is connected in series in the voltage sampling circuit, a control end of the second switching device is connected to the gate of the power control transistor, and when the power control transistor is turned off, the second switching device is turned off.

2. The dimming power supply according to claim 1, wherein the first switching device is connected in series between the input end of the driving circuit and a common ground, or the first switching device is connected in series between the output end of the driving circuit and the common ground.

3. The dimming power supply according to claim 1, wherein the driving circuit includes a pulse width modulation (PWM) signal amplification circuit and a driving control transistor, an input end of the PWM signal amplification circuit is connected with the output end of the control circuit, an output end of the PWM signal amplification circuit is connected with the gate of the power control transistor through a source and a drain of the driving control transistor, a gate of the driving control transistor is connected with an operating voltage, and the gate of the driving control transistor is connected to the common ground through the first switching device.

4. The dimming power supply according to claim 1, wherein the voltage sampling circuit further includes a plurality of voltage dividing resistors, one end of a voltage dividing resistor R4 is connected with the negative electrode of the load, another end of the voltage dividing resistor R4 is connected with a drain of the second switching device, a source of the second switching device is grounded through a voltage dividing resistor R2, a gate of the first switching device is connected with one end of the voltage dividing resistor R2 facing away from the common ground, a source of the first switching device is connected to the common ground, and a drain of the first switching device is connected with the input end of the driving circuit, the output end of the driving circuit or the gate of the driving control transistor.

5. The dimming power supply according to claim 1, wherein the control end of the second switching device is connected with the gate of the power control transistor through an elimination control circuit.

6. The dimming power supply according to claim 5, wherein the elimination control circuit includes a plurality of resistors, the gate of the power control transistor is connected with the control end of the second switching device through a resistor R5, and the control end of the second switching device is connected with the common ground through a resistor R6.

7. The dimming power supply according to claim 5, wherein the elimination control circuit includes a plurality of resistors and transistors, the control end of the second switching device is connected with the common ground through the resistor R6, the control end of the second switching device is connected with the operating voltage through the resistor R5, a collector and an emitter of a triode Q4 and a resistor R7, one end of the resistor R7 facing away from the operating voltage is connected with a gate of the triode Q4 through a resistor R8, the gate of the triode Q4 is connected with the common ground through a drain and a source of a Metal-Oxide-Semiconductor (MOS) transistor Q5, a gate of the MOS transistor Q5 is connected with the gate of the power control transistor through a resistor R10, and one end of the resistor R10 facing away from the power control transistor is connected with the common ground through a resistor R9.

* * * * *